Jan. 16, 1940.　　　J. B. REINHARD ET AL　　　2,186,992
PROPELLER CONNECTION AND CONTROL
Filed Dec. 29, 1937　　　3 Sheets-Sheet 1
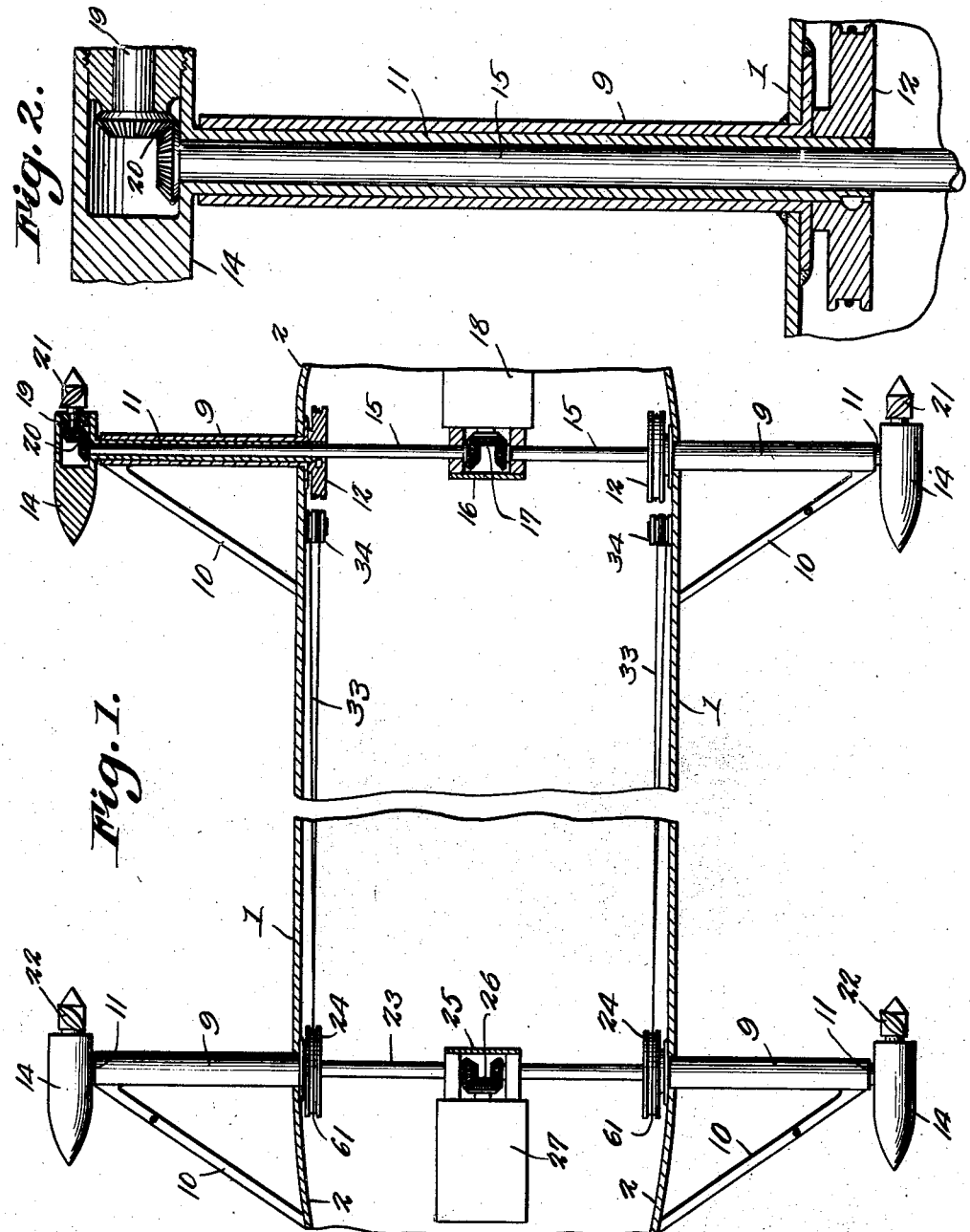
J. B. Reinhard
L. J. Koch INVENTORS.
BY
ATTORNEYS.

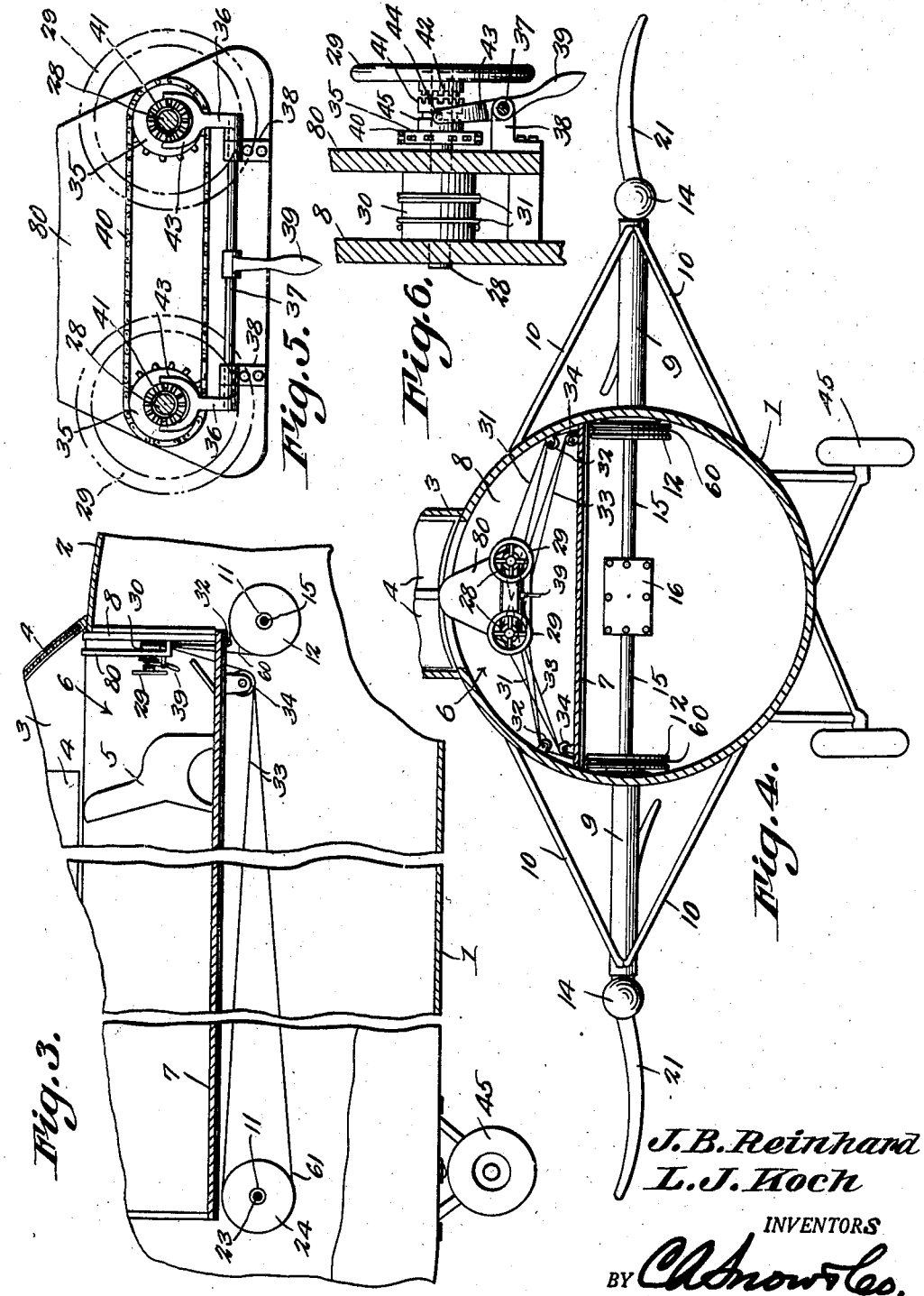

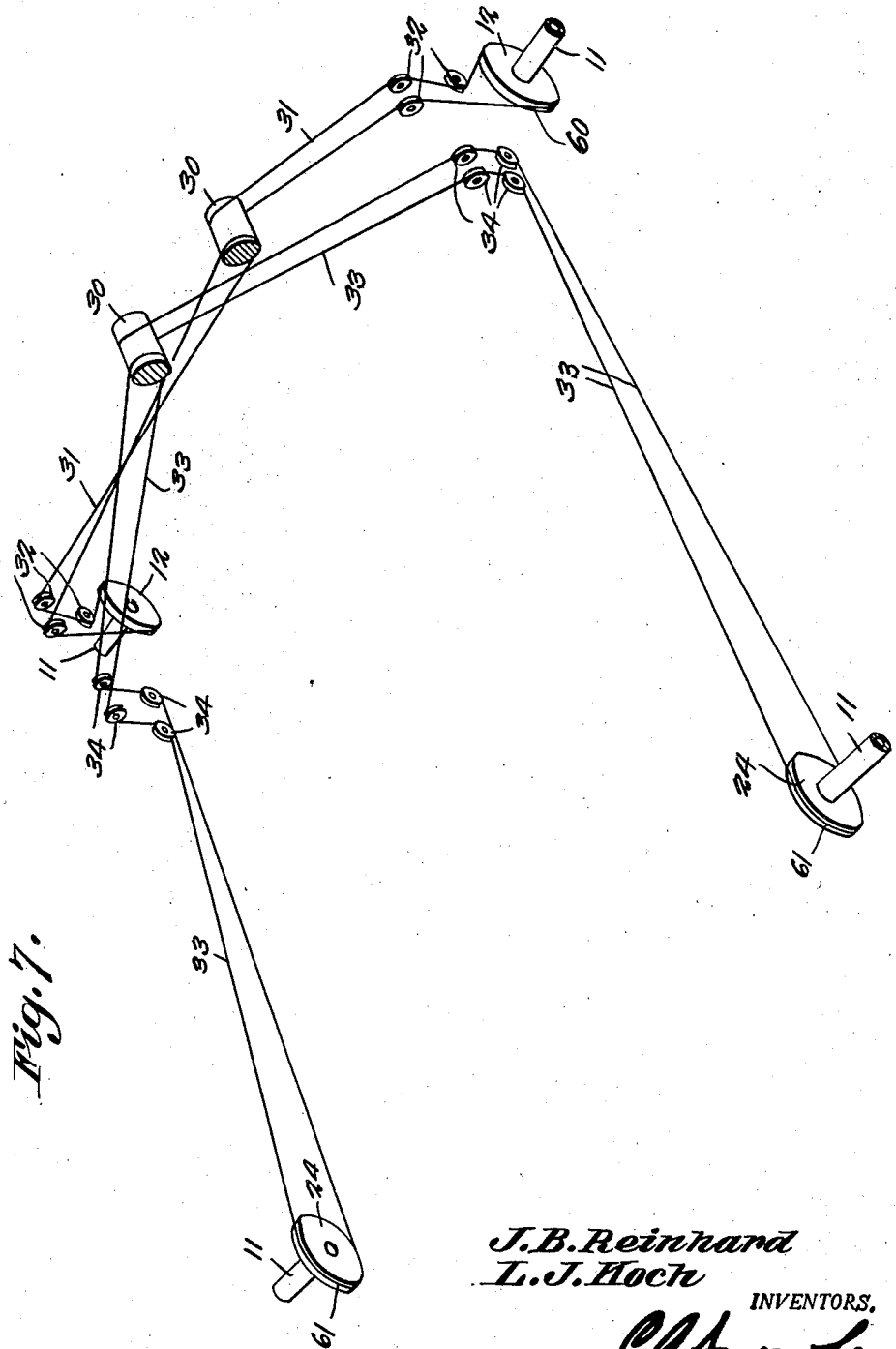

UNITED STATES PATENT OFFICE 2,186,992

PROPELLER CONNECTION AND CONTROL

John B. Reinnard and Lynn J. Koch, Allentown, Pa.; said Reinhard assignor to said Koch Application December 29, 1937, Serial No. 182,338

1 Claim. (Cl. 244—17)

The device forming the subject matter of this application is an aircraft advanced primarily by side propellers. The invention aims to provide novel means for mounting and driving the propellers, and for tilting them so that they will exert an upward thrust, a downward thrust, or a horizontal thrust, as may be required. Another object of the invention is to provide novel means whereby the propellers may be tilted separately in pairs. A further object of the invention is to supply novel means whereby all the propellers may be coupled together for actuation by a single wheel under the control of an operator.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of the what is claimed, without departing from the spirit of the invention.

In the drawings:

Fig. 1 shows in horizontal section, a device constructed in accordance with the invention, sundry parts being sectioned away;

Fig. 2 is a horizontal section showing the means whereby rotation and tilting movement are imparted to the propellers;

Fig. 3 is a vertical longitudinal section, wherein parts are broken away;

Fig. 4 is a transverse section of the ship, looking forwardly;

Fig. 5 is a sectional view, with most parts in elevation, showing a means whereby all the propellers can be coupled together for tilting movement from a single steering wheel;

Fig. 6 is a vertical sectional view of the structure depicted in Fig. 5;

Fig. 7 is a diagrammatic view illustrating the controlling flexible elements and their mountings.

In carrying out the invention, there is supplied a bullet-shaped wingless body 1 which may be tapered at both ends, as indicated at 2, to decrease resistance. The body 1 is provided with the usual landing gear 45, which may be of any preferred construction. The body 1 has a raised roof 3, equipped with any desired number of transparent panels 4, facilitating observation by a pilot occupying a seat 5 in a pilot's compartment 6 formed by a horizontal platform 7 and a vertical wall 8, the wall carrying a rearwardly-projecting bracket 80.

The body 1 has laterally-outstanding front and rear tubular bearings 9, sustained by braces 10 connected to the body 1. First or tubular shafts 11 are mounted to turn in the bearings 9, and to the inner ends of the shafts 11, pulleys 12 and 24 are secured, the pulleys 12 being forward pulleys, and the pulleys 24 being rear pulleys.

Elongated gear housings 14 are secured to the outer ends of the tubular shafts 11 and extend longitudinally of the machine. Solid or inner shafts 15 and 23 are journaled in the tubular shafts 11. The forward shafts 15 extend into a casing 16 on a forward engine 18, the inner ends of the shafts 15 being connected to the shaft of the engine 18 by beveled gears 17. In a like manner, the rear shafts 23 extend into a casing 25 on a rear engine 27, the inner ends of the shafts 23 being operatively connected to the shaft of the engine 27 by beveled gears 26.

Snort shafts 19, disposed parallel to the line of flight, are mounted to turn in the forward parts of the gear housings 14, which are secured on the outer ends of the tubular shafts 11. The short shafts 19 are connected to the shafts 15 and 23 by beveled gears 20. Front propellers 21 are secured to the short forward shafts 19, and rear propellers 22 are secured to the corresponding rear shafts 19. The gear housings 14 are solid at their rear ends, to offset the weight of the propellers 21 and 22, and are pointed at their rear ends, to produce a streamline effect.

The drive for the propellers 21 and 22 is simple, the front propellers 21 being driven by the forward engine 18, the beveled gears 17, the shafts 15, the beveled gears 20 and the short forward shafts 19. The rear propellers 22 are correspondingly driven by the rear engine 27, the beveled gears 26, the shafts 23, the corresponding beveled gears 20, and the corresponding shafts 19.

Shafts 28 are journaled in the wall 8 and in the bracket 80 and are provided at their rear ends with wheels 29, accessible to a person occupying the pilot's seat 5. Secured to the shafts 28, adjacent to the hand wheels 29, are clutch members 42 (Fig. 6). Drums 30 are provided, and are secured to the shafts 28, between the wall 8 and the bracket 80, as shown in Fig. 6.

Double run flexible elements 31 are engaged with one of the drums 30 and are passed over idlers 32, supported for rotation on the machine, the said flexible elements being looped at 60 about the pulleys 12 that are secured to the inner ends of the forward tubular shafts 11, a construction manifest when Figs. 3 and 7 are compared.

Double run flexible elements 33 are engaged with the other of the drums 30, and are passed over idlers 34, supported for rotation on the machine, the said flexible elements being looped at 61 about the pulleys 24 on the rear tubular shafts 11, as disclosed in Figs. 3 and 7.

It will be understood readily that by turning the appropriate one of the shafts 28, by means of the corresponding hand wheel 29, the corresponding drum 30 will be rotated, and the flexible elements 31, cooperating with the pulleys 12, will rotate the forward hollow shafts 11, the casings 14 being tilted, and the forward propellers 21 being caused to exert an upward thrust, a downward thrust, or a horizontal thrust, as occasion may demand.

In a similar way, the other of the shafts 28, operated by its hand wheel 29, will actuate the corresponding drum 30 and the flexible elements 33, the pulleys 24 operating the rear tubular shafts 11 and the rear propellers 22, the rear propellers being caused to exert an upward thrust, a downward thrust, or a horizontal thrust, in accordance with the wishes of the pilot. By a proper manipulation of the steering wheels 29, the propellers 21 and 22 may be tilted in pairs or together. It will be understood that any desired or usual propelling means, supplemental to the propellers 21 and 22, may be furnished.

It is not necessary that both of the wheels 29 be operated in order to tilt all of the propellers 21 and 22 together. It is possible to tilt the said propellers through the manipulation of a single hand wheel 28. One means to that end, but not a compulsory structure, is shown in Figs. 5 and 6.

In Figs. 5 and 6, a shaft 37 is mounted to rock in bearings 38 on the bracket 80 and is manipulated by an operating member 39, such as a handle secured to the shaft 37 between the ends thereof. To the terminal portions of the shaft 37 are secured arms 36 having forks 43 provided with inwardly extended pins 44 engaged in circumscribing grooves 45 formed in the hubs of sprocket wheels mounted on the shafts 28 for rotation and for movement longitudinal thereof. The sprocket wheels 35 are connected by a sprocket chain 40, and the hub of each sprocket wheel is supplied with a clutch member 41 adapted to cooperate with the clutch members 42 on the shafts 28.

By means of the handle 39, the shaft 37 may be rocked, and its arms 36 will shift the sprocket wheels 35 lengthwise of the shafts 28, until the clutch members 41 on the sprocket wheels engage with the clutch members 42 on the shafts 28. In this way, the shafts 28 will be coupled together, and by operating either of the hand wheels 29, rotation will be transmitted to all of the tubular shafts 11, all of the propellers 21 and 22 being tilted at once, so that they will thrust either downwardly or upwardly with respect to a horizontal plane.

The device is simple in construction, but it affords a means whereby the side propellers of an airship may be driven, or be tilted selectively, in the way hereinbefore set forth.

Having thus described the invention, what is claimed is:

In an airship, a body, a platform in the body, a support located adjacent to the forward end of the platform and disposed substantially at right angles thereto, front and rear bearings at opposite sides of the body, front and rear first hollow shafts journaled in the bearings, front and rear second shafts journaled in the corresponding first shafts, propellers carried at the outer ends of the first shafts and rotatable about axes parallel to the line of flight, means for driving the propellers from the second shafts, rotatable members journaled in the support and under the control of an operator on the platform, pulleys on the inner ends of the front second shafts, pulleys on the inner ends of the rear second shafts, all of said pulleys being disposed below the platform, flexible elements looped about one of the rotatable members and about the pulleys of the front second shafts, other flexible elements looped about the other of the rotatable members and about the pulleys of the rear second shafts, direction changing idlers leading all of the flexible elements outwardly toward the sides of the body and downwardly below the platform, and direction changing idlers leading said other flexible elements rearwardly below the platform.

JOHN B. REINHARD.
LYNN J. KOCH.